US012646910B2

(12) United States Patent
Lehmann et al.

(10) Patent No.: US 12,646,910 B2
(45) Date of Patent: Jun. 2, 2026

(54) METHOD AND DEVICE FOR WELDING AT LEAST THREE CABLES, EACH WITH TWO CONDUCTORS PROTRUDING FROM THE SHEATH ENDS OF THE CABLES

(71) Applicant: LISA DRÄXLMAIER GMBH, Vilsbiburg (DE)

(72) Inventors: Lutz Lehmann, Vilsbiburg (DE); Thomas Kapfenberger, Kumhausen (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 610 days.

(21) Appl. No.: 17/987,168

(22) Filed: Nov. 15, 2022

(65) Prior Publication Data

US 2023/0074917 A1     Mar. 9, 2023

Related U.S. Application Data

(63) Continuation of application No. PCT/EP2021/062302, filed on May 10, 2021.

(30) Foreign Application Priority Data

May 20, 2020   (DE) .......................... 102020113672.2

(51) Int. Cl.
*H02G 1/00*          (2006.01)
*B23K 20/10*        (2006.01)
(Continued)

(52) U.S. Cl.
CPC ............. *H02G 1/005* (2013.01); *B23K 20/10* (2013.01); *B23K 20/24* (2013.01); *H02G 1/12* (2013.01); *B23K 2101/38* (2018.08)

(58) Field of Classification Search
CPC . H02G 1/005; H02G 1/12; H02G 1/14; Y10T 29/49195
(Continued)

(56) References Cited

U.S. PATENT DOCUMENTS 8,441,160 B2 *   5/2013   Watanabe ............. F04B 39/121
                                                            310/71
9,496,670 B2    11/2016   Wagner et al.
(Continued)

FOREIGN PATENT DOCUMENTS

WO          2019076433 A1      4/2019
WO          WO2019076433      *   4/2019 ........... B23K 20/106

OTHER PUBLICATIONS

International Search Report issued in corresponding International Application PCT/EP2021/062302, mailed Aug. 12, 2021.
(Continued)

*Primary Examiner* — Sunil K Singh
(74) *Attorney, Agent, or Firm* — Burris Law, PLLC

(57)          ABSTRACT

A method for welding at least three cables, each with two conductors protruding from the sheath ends of the cables includes stripping ends of the first conductors and stacking from opposite directions atop one another forming a first stack. The stripped ends of the second conductors are stacked atop one another from opposite directions at a working distance from the first stack forming a second stack. The first stack is arranged in a welding area of a welding device and welded to a first welding point, while the second stack is arranged in a waiting area spaced by the working distance from the welding area. The first welding point is moved by the working distance from the welding area to a storage area, while the second stack is moved by the working distance from the waiting area into the welding area and is welded to a second welding point.

9 Claims, 3 Drawing Sheets

(51) Int. Cl.
    *B23K 20/24*       (2006.01)
    *H02G 1/12*        (2006.01)
    *B23K 101/38*     (2006.01)

(58) Field of Classification Search
    USPC ................................... 29/869, 868, 872, 873
    See application file for complete search history.

(56) References Cited

U.S. PATENT DOCUMENTS

| | | |
|---|---|---|
| 2014/0109385 A1 | 4/2014 | Lu et al. |
| 2016/0294140 A1* | 10/2016 | Trube ..................... B23K 20/10 |
| 2019/0030639 A1 | 1/2019 | Schmidt et al. |

OTHER PUBLICATIONS

Office Action issued in corresponding DE Application 10 2020 113 672.2, issued Apr. 7, 2021, 4 pages.
Decision to Grant issued in corresponding DE Application 10 2020 113 672.2, issued Nov. 22, 2021, 8 pages.

* cited by examiner

METHOD AND DEVICE FOR WELDING AT LEAST THREE CABLES, EACH WITH TWO CONDUCTORS PROTRUDING FROM THE SHEATH ENDS OF THE CABLES

CROSS-REFERENCE TO RELATED APPLICATIONS

This application is a continuation of International Application No. PCT/EP2021/062302, filed on May 10, 2021, which claims priority to and the benefit of German Patent Application DE 10 2020 113 672.2, filed on May 20, 2020. The disclosures of the above applications are incorporated herein by reference.

FIELD

The present disclosure relates to a method and device for welding at least three cables, each with two conductors protruding from the sheath ends of the cables.

BACKGROUND

The statements in this section merely provide background information related to the present disclosure and may not constitute prior art.

The present disclosure is described below primarily in connection with cables for vehicle electrical systems. However, the present disclosure can be used for any application in which cables are connected.

A cable harness is a component in which, in particular, electrical wires of a vehicle are bundled together. The cable harness can have branches at which a cable branches off in a Y-shape or an X-shape. These branches can be created using a separate junction component, wherein same-pole conductors of the cables can be connected via a common busbar.

SUMMARY

This section provides a general summary of the disclosure and is not a comprehensive disclosure of its full scope or all of its features.

The present disclosure provides an improved method and an improved device for welding at least three cables, each with two conductors protruding from the sheath ends of the cable, using means that are as simple as possible in terms of design.

Three multi-core cables can be quickly and safely electrically conductively connected to each other to form a Y-connection with the approach presented here without requiring an intermediate component. Four multi-core cables can likewise be quickly and safely electrically conductively connected to each other to form an X-connection without requiring an intermediate component.

A method for welding at least three cables, each with two conductors protruding from the sheath ends of the cables is proposed, wherein the stripped conductor ends of the first conductors are alternately stacked on top of each other from opposite directions to form a first stack, and the stripped conductor ends of the second conductors are alternately stacked on top of each other from opposite directions at a working distance from the first stack to form a second stack, the first stack is arranged in a welding area of a welding machine and welded to form a first welding point, while the second stack is arranged in a waiting area that is spaced from the welding area by the working distance, the first welding point is removed from the welding area and moved by the working distance into a storage area, while the second stack is removed from the waiting area and moved by the working distance into the welding area and is welded to form a second welding point.

A cable can have several conductors that are electrically insulated from one another. The conductors each have their own insulation. The insulation can be made, for example, from plastic material. The conductors run inside a sheath of the cable. The sheath can also be made, for example, from plastic material. An electrically conductive shield of the cable can be integrated into the sheath. The shield can be made, for example, from metallic material such as aluminum. The shield can be braided. The sheath of the cable ends at one sheath end. The conductors are longer than the sheath and protrude beyond the end of the sheath. The conductors can have metallic strands as electrical conductors. The electrical conductors can also be configured as wires. The electrical conductors can be made, for example, from copper alloy. The insulation is removed from the electrical conductors at the stripped wire ends or the ends of the wires. The electrical conductors are thus exposed at the stripped wire ends. The wire ends can essentially be stripped to the same extent.

The cables can be positioned using a positioning device. The cables can be placed in fixing devices that are designed to position the conductor ends axially and laterally within the working space. The positioning device can have a fixing device for each cable, which has a sheath receptacle for fixing the sheath end of each cable and two conductor guides for aligning the two conductor ends of the cable at the working distance. The sheath ends and/or the conductors can be clamped in the fixing devices. The conductor ends can protrude from opposite directions into a working space of the positioning device. In order to position the three cables, two of the fixing devices can be arranged on one side of the working space, while a single fixing device is arranged on the opposite side of the working space. The two fixing devices on one side can be arranged one on top of the other in a welding position. One of the fixing devices can be movable in order to be able to insert the cable into the other fixing device. The first cable can be inserted first. The fixing device with the inserted third cable can be folded onto the fixing device with the inserted first cable after the second cable has been inserted. The sheath end of the third cable can be placed on the sheath end of the first cable.

Conductor ends of conductors of a fourth cable can be arranged in the working space from the second side. The first conductor end of the fourth cable can be aligned with the first stack and form a fourth layer of the first stack. The second conductor end of the fourth cable can be aligned with the second stack and form a fourth layer of the second stack. Two fixing devices can be arranged on both sides of the working space in order to position four cables.

The positioning device as a whole can be movable within at least two axes relative to a welding system. For this purpose, the positioning device can be provided with a movement device. The movement device can have two linear actuators, for example, form moving the stack or the welding areas relative to the welding system.

The welding system can be an ultrasonic welding system. A welding area of the welding system can be defined by delimiting elements of the welding system. The welding area can have elements delimiting four sides. The welding area can therefore be open on two sides. The fixing devices of the positioning device can be arranged on the open sides of the welding area. The delimiting elements can be arranged, for example, at the top, bottom, front, and back relative to the welding area. The delimiting elements can be designed as an anvil, an oscillator or sonotrode, and as two side shifters. The anvil and the oscillator can delimit the welding area at opposite sides, such as, for example, the top and bottom. The side shifters can be arranged at the two other opposite sides of the welding area. The side shifters can be adjacent to, for example, the welding area at the front and back. The stripped conductor ends can protrude from the fixing devices into the welding area from the right and left.

The anvil and the oscillator can be movable relative to one another so as to compress the conductor ends which can be arranged between them. The oscillator can couple ultrasonic vibrations into the conductor ends and weld them together through locally generated frictional heat. The side shifters can prevent the conductor ends from slipping or deviating laterally.

To arrange a stack and to remove the weld, at least one of the delimiting elements, that is, the anvil, the oscillator, or at least one of the side shifters can be moved in order to open the welding area at least at one of the sides.

A waiting area can be a recess in one of the side shifters of the welding device. The waiting area can be arranged in the front or back side shifter. A storage area can be a recess in the other side shifter. The waiting area can have a larger volume than the storage area because the welding area is smaller or more compact than the stack. The waiting area and the storage area can also have the same size. The side shifters can then be designed as identical parts. The recesses can have U-shaped configuration. The stack or the welding area can then be arranged in the respective recess from an open side of the recess.

The conductor ends of the first cable can be arranged in the working space from a first side. The first conductor end of the first cable can configure a first layer of the first stack in the working space. The second conductor end of the first cable can be arranged in the working space at a distance from the first conductor end of the first cable by the working distance and configure a first layer of the second stack. The conductor ends of the second cable can be arranged in the working space from a second side opposite the first side. The first conductor end of the second cable can be aligned with the first stack and configure a second layer of the first stack. The second conductor end of the second cable can be aligned with the second stack and configure a second layer of the second stack. The conductor ends of the third cable can be arranged in the working space from the first side. The first conductor end of the third cable can be aligned with the first stack and configure a third layer of the first stack. The second conductor end of the third cable can be aligned with the second stack and configure a third layer of the second stack. The welding area can be arranged in the working space. The first stack can thus be stacked in the welding area, while the second stack is stacked in the waiting area. Alternatively, the two stacks can be stacked outside of the welding system and transported to the welding system in finished state. The welding system can then perform a previous welding process while the stacks for the next welding process are already being stacked.

The conductor ends of the second cable and the fourth cable can be aligned with a lateral offset on the first stack and the second stack. The stacks can be slightly wider due to the lateral offset. A welding surface of the welding points can be enlarged by the lateral offset. In this way, a contact resistance of the welding points can be reduced. An increased packing density can be achieved through the lateral offset Since the conductor ends essentially have a round cross-section. The thickness of the welding points can thus be reduced.

The cables welded together at the two welding points can be moved to a packaging area. The welding areas can be arranged in a junction box and electrically isolated from each other. The junction box can be closed so that it seals around the cables protruding from the junction box. The welding area can be cleared automatically to enable a subsequent welding process on the same welding device.

The approach presented here also creates a device that is designed to perform, monitor, or implement the steps of a variant of the method presented here in corresponding devices.

The device can be an electrical device with at least one computing unit for processing signals or data, at least one memory unit for storing signals or data, and at least one interface and/or one communication interface for inputting or outputting data that are embedded in a communication protocol. The computing unit can be, for example, a signal processor, a so-called system ASIC, or a microcontroller for processing sensor signals and outputting data signals as a function of the sensor signals. The storage unit can be, for example, a flash memory, an EPROM, or a magnetic storage unit. The interface can be designed as a sensor interface for inputting the sensor signals from a sensor and/or as an actuator interface for outputting the data signals and/or control signals to an actuator. The communication interface can be designed to input or output the data in a wireless and/or wired manner. The interfaces can also be software modules that are present, for example, on a microcontroller alongside other software modules.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
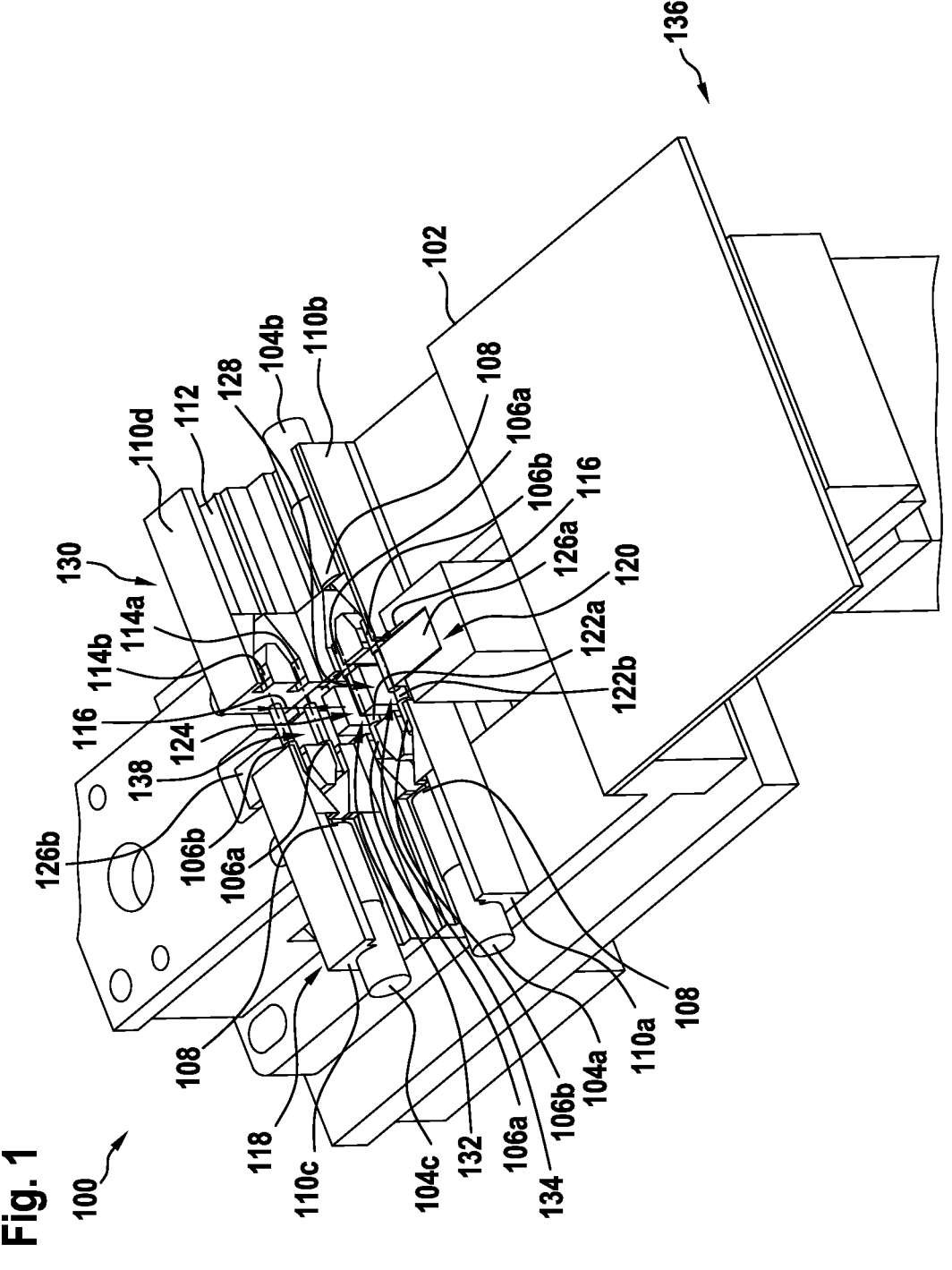
FIG. 1 shows a representation of a welding system with a positioning device according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a representation of a welding system 100 with a positioning device 102 according to the teachings of the present disclosure. Three cables 104 are welded to each other in the welding system 100. The cables 104 each have two conductors 106a, 106b. All of the first conductors 106a are electrically conductively connected to one another. All of the second conductors 106b are likewise electrically conductively connected to one another. The first conductors 106a and the second conductors 106b, however, remain electrically insulated from one another. The three cables 104 are welded into a Y-shaped connection or junction.

Four cables 104 can also be welded into an X-shaped connection in the welding system 100.

The positioning device 102 is configured for positioning the three or four cables 104 with their two conductors 106, which protrude from the sheath ends 108 of the cables 104, for a welding process of the welding system 100. For each cable 104, the positioning device 102 has a fixing device 110 with a sheath receptacle 112 for fixing the sheath end 108 of each cable 104, a first conductor receptacle 114a for aligning the first conductor 106a of each cable 104 within a layer plane and on a first stacking plane, and at least one second conductor receptacle 114b for aligning the second conductor 106b of the respective cable 104 within the layer plane, and at a second stacking plane spaced by a working distance 116 from the first stacking plane.

The sheath receptacles 112 and the conductor receptacles 114 are designed as grooves. The cables 104 can be inserted laterally into the grooves with the conductors 106 protruding from the sheath ends 108. The sheath receptacles each have an axial stop face for the sheath of each cable 104. The conductor receptacles 114 each have at the openings a lateral guide for isolating the respective conductors 106. The sheath receptacles 112 and the conductor receptacles 114 can be undersized.

The first fixing device 110a is arranged on a first side 118 of a working space 120 of the positioning device 102. The conductor receptacles 114 of the first fixing device 110a open into the working space 120 from the first side 118 of the working space 120 and are arranged within a first layer plane.

The first cable 104a is inserted in the first fixing device 110a. The first conductor 106a of the first cable 104a is fixed in the first conductor receptacle 114a of the first fixing device 110a. The positioning device 102 is shown here in a first working position. A stripped conductor end 122 of the first conductor 106a is arranged in a welding area 124 of the welding system 100 in the first working position. The welding area 124 is delimited by two side shifters 126 at the front and back. The first stacking level is arranged centrally in the welding area 124. The first conductor end 122a is therefore arranged between the side shifters 126. The second conductor 106b of the first cable 104a is fixed in the second conductor receptacle 114b of the first fixing device 110a. A stripped conductor end 122 of the second conductor 106b is arranged in a waiting area 128 of the welding system 100 in the first working position. The waiting area 128 is configured as a U-shaped recess in the front side shifter 126a. The second stacking level is arranged in the center of the waiting area 128. The center of the waiting area 128 is thus spaced from the center of the welding area 124 by the working distance 116. The conductor ends 122 of the first cable 104a are arranged within the first layer level and rest on an anvil of the welding system 100.

The second fixing device 110b is arranged on a second side 130 of the working space 120 that is opposite to the first side 118. The conductor receptacles 114 of the second fixing device 110b open out from the second side 130 of the working space 120 into the working space 120 and are arranged within a second layer level with a height offset with respect to the first layer level.

The second cable 104b is inserted in the second fixing device 110b. The first conductor 106a of the second cable 104b is fixed in the first conductor receptacle 114a of the second fixing device 110b. A stripped conductor end 122 of the first conductor 106a is arranged in the welding area 124 in the first working position of the positioning device 102. The second conductor 106b of the second cable 104b is fixed in the second conductor receptacle 114b of the second fixing device 110b. A stripped conductor end 122 of the second conductor 106b is arranged in the waiting area 128 in the first working position. The conductor ends 122 of the second cable 104b are arranged within the second layer level. The conductor ends 122 of the second cable 104b and the conductor ends 122 of the first cable 104a protrude from opposite directions into the welding area 124 and the waiting area 128. The conductor ends 122 of the second cable 104b and the conductor ends 122 of the first cable 104a overlap each other to a great extent. The first conductor ends 122a of the first and second cables 104a, 104b configure a first stack 132. The second conductor ends 122b of the first and second cables 104a, 104b configure a second stack 134.

The third fixing device 110c is arranged on the first side 118 of the working space 120. The conductor receptacles 114 of the third fixing device 110c open into the working space 120 from the first side 118 of the working space 120. The third fixing device 110c is shown here in an insertion position. In the insertion position, the third fixing device 110c is folded out approximately 90° from a welding position. The sheath receptacles 112 and the conductor receptacles 114 of the first fixing device 110a and of the third fixing device 110c are accessible in the open state of the insertion position. The conductor receptacles 114 of the third fixing device 110c are arranged within a third layer plane with a height offset with respect to the second layer plane in the welding position.

The third cable 104c is inserted in the third fixing device 110c. The first conductor 106a of the third cable 104c is fixed in the first conductor receptacle 114a of the third fixing device 110c. The second conductor 106b of the third cable 104c is fixed in the second conductor receptacle 114b of the third fixing device 110c. The conductor ends 122 of the third cable 104c protrude from the same direction as the conductor ends 122 of the first cable 104a into the working space 120. In the welding position, and when the positioning device 102 is arranged in the first working position, the first conductor end 122a of the third cable 104c is arranged in the welding area 124 and is part of the first stack 132, while the second conductor end 122b of the third cable 104c is arranged in the waiting area 128 and is part of the second stack 134. The conductor ends 122 of the third cable 104c also largely overlap the conductor ends 122 of the second cable 104b and the conductor ends 122 of the first cable 104a.

The optional fourth fixing device 110d is arranged on the second side 130 of the working space 120. The conductor receptacles 114 of the fourth fixing device 110d open into the working space 120 from the second side 130 of the working space 120. The fourth fixing device 110d is also shown in an insertion position and is folded out approximately 90° from a welding position. The sheath receptacles 112 and the conductor receptacles 114 of the second fixing device 110b and the fourth fixing device 110d are accessible in the open state of the insertion position. The conductor receptacles 114 of the fourth fixing device 110d are arranged within a fourth layer plane with a height offset with respect to the third layer plane in the welding position.

The height offsets are here all identical. The conductor receptacles 114 of the second fixing device 110*b* are arranged between the conductor receptacles 114 of the first and third fixing devices 110*a*, 110*c* in the welding position of the third fixing device 110*c*. The conductor receptacles 114 of the third fixing device 110*c* are arranged in the welding position of the third and fourth fixing device 110*c*, 110*d* between the conductor receptacles 114 of the second and fourth fixing device 110*b*, 110*d*.

The optional fourth cable is not inserted into the fourth fixing device 110*d* here.

The positioning device 102 is provided with a movement device 136. The movement device 136 is configured for moving the positioning device 102 out of the first working position by the working distance 116 into a second working position. In the first working position, the first stack 132 is arranged in the welding area 124 and is welded by the welding system 100 to configure a first welding point, while the second stack 134 is arranged in the waiting area 128. In the second working position, the second stack 134 is arranged in the welding area and is welded by the welding system 100 to configure a second welding point, while the first stack 132 welded to the first welding point is arranged in a storage area 138. The storage area 138 is configured as a U-shaped recess in the rear side shifter 126*b*. A center of the storage area 138 is spaced from the center of the welding area 124 by the working distance 116.

At least during welding, the anvil and oscillator are arranged in such a way that the top and bottom of the stacks 132, 134 are evenly compressed. The anvil and oscillator can be moved up and down for this purpose. A center between the anvil and the oscillator is essentially adjusted to a center of each stack 132, 134. When welding three cables 104, the center between the anvil and the oscillator is adjusted to the second layer plane. When welding four cables 104, the center between the anvil and the oscillator is adjusted to a center between the second layer level and the third layer level.

The first fixing device 110*a* and the second fixing device 110*b* are fixedly connected to the movement device 136. The third fixing device 110*c* is designed to be foldable. In folded state, the conductor receptacles 114 of the third fixing device 110*c* are arranged within the third layer plane. The grooves of the first fixing device 110*a* are aligned in the direction of the third fixing device 110*c*. In folded state, the grooves of the third fixing device 110*c* are aligned in the direction of the first fixing device 110*a*. The grooves of the second fixing device 110*b* are aligned in the direction of the fourth fixing device 110*d*. In the folded state, the grooves of the fourth fixing device 110*d* are aligned in the direction of the second fixing device 110*b*. The cables 104 can be inserted when the third and fourth fixing devices 110*c*, 110*d* are in unfolded state.

In one variation, the conductor receptacles 114 of the first fixing device 110*a* and of the third fixing device 110*c* each have a positive lateral offset with respect to the stacking planes. The conductor receptacles 114 of the second fixing device 110*b* and the fourth fixing device 110*d* each have a negative lateral offset to the stack planes.

Figure 2:
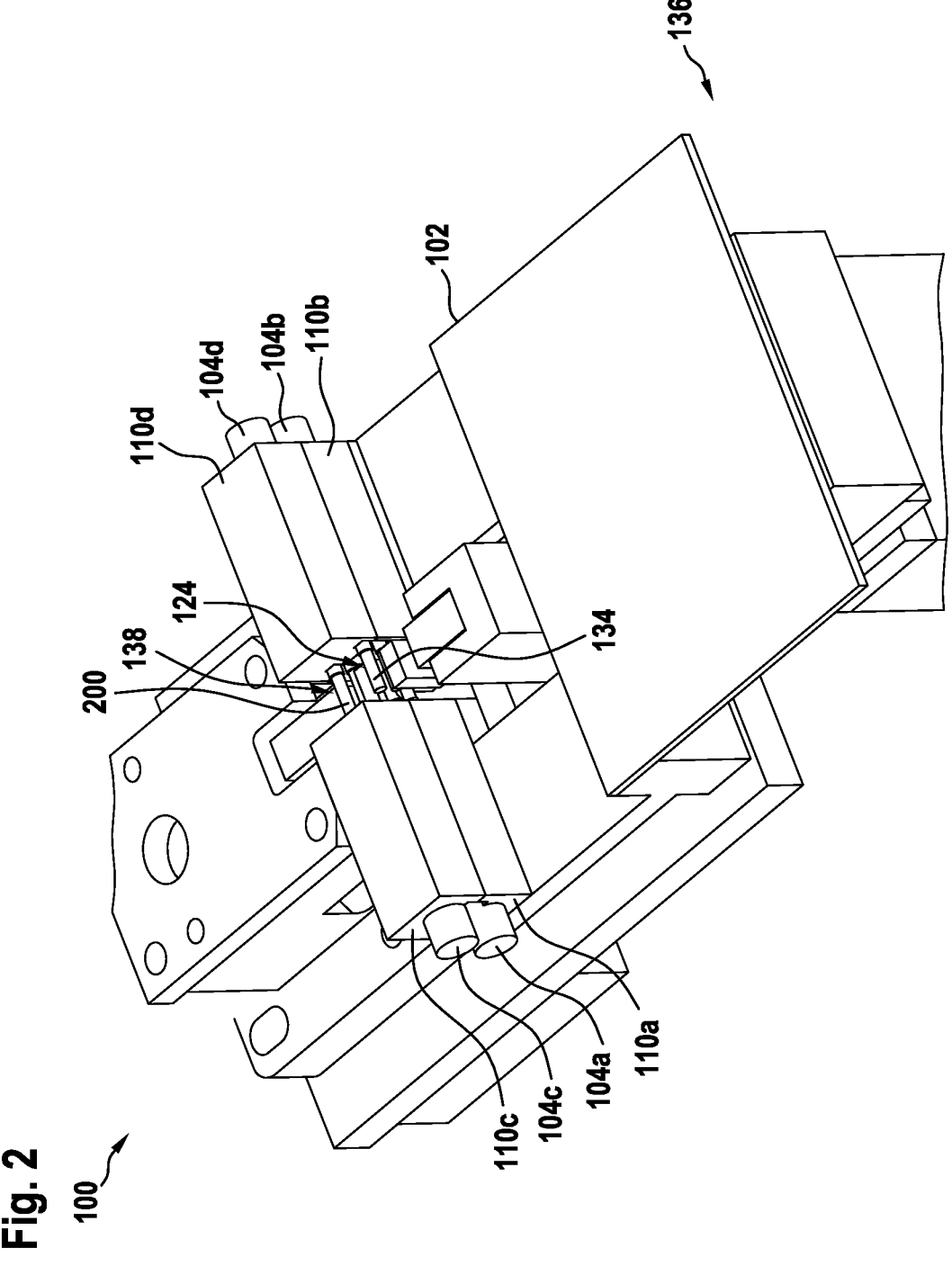
FIG. 2 shows a representation of a welding system with a positioning device according to the teachings of the present disclosure.

FIG. 2 shows a representation of a welding system 100 with a positioning device 102 according to one variation. The welding system 100 essentially corresponds to the welding system in FIG. 1. In contrast to this, here the fourth cable 104*d* is inserted into the fourth fixing device 110*d*, and the third and the fourth fixing devices 110*c*, 110*d* are shown in the folded welding position. In addition, the first stack has already been welded here to configure the first welding point

200 and the positioning device 102 has been moved by its movement device 136 from the first working position into the second working position. The second stack 134 is therefore arranged in the welding area 124 here, while the first welding point 200 is arranged in the storage area 138.

The third cable 104*c* rests directly on the first cable 104*a*. The fourth cable 104*d* lies directly on the second cable 104*b*.

Figure 3:
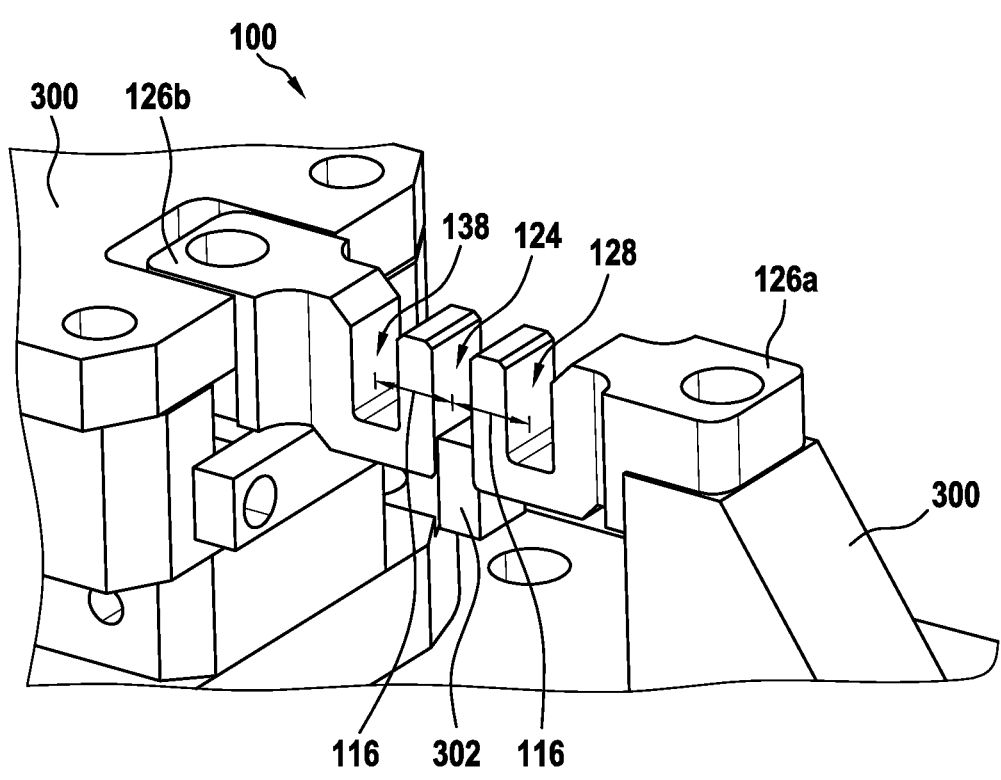
FIG. 3 shows a representation of a welding system with side shifters according to the teachings of the present disclosure.

FIG. 3 shows a representation of a welding system 100 with side shifters 126 according to one variation. The welding system 100 essentially corresponds to the welding system shown in FIGS. 1 and 2. The side shifters 126 are designed here at the same time as identical parts. The recesses for configuring the waiting area 128 and the storage area 138 have identical dimensions. A frame 300 is adapted to the welding system so as to be able to use the same parts. The rear side shifter 126*b* contains the recess for the welded strand bundle. The front side shifter 126*a* contains the recess for the prepared strand bundles.

The welding system 100 is here an ultrasonic welding system. The positioning device is not shown herein. When the welding system 100 is in operational state, the welding area 124 is defined by an oscillator and an anvil 302, as well as the front side shifter 126*a* and the rear side shifter 126*b*. Each side shifter 126 is provided with the recesses of the waiting area 128 and the storage area 138 at the working distance 116 from the welding area 124. The anvil 302 is arranged here below the welding area, and the waiting area 128 and the storage area 138 are open at the top. At least the oscillator is movable and is not shown herein. As a result, the welding area 124 has here an upwardly directed opening through which each of the stacks to be welded can be arranged in the welding area 124, while either the second stack to be welded can be arranged in the waiting area 128 from the same direction, or the first stack that has already been welded can be arranged from the same direction in the storage area.

To reposition the first welding area from the welding area 124 to the storage area 138, the oscillator is retracted and the second stack and the first welding area which was just welded are simultaneously lifted out of the welding area 124 and the waiting area 128 by the moving device, moved simultaneously by the working distance 116 in the direction of the storage area 138, and simultaneously lowered into the storage area 138 or the welding area.

The oscillator is then moved back into the welding area and the second stack is compressed between the anvil 302 and the oscillator and caused to vibrate by the oscillator until the conductor ends of the second stack have become so hot that they are pressed and heated to the second welding area to be welded.

In other words, a welding device for producing axisymmetric wired connections is described. The welding device can be used to produce high-voltage distributors or similar strand bundles. A considerable axial offset of the sheathed cables relative to the welding can be avoided with the approach presented here since the welding plane is not mechanically limited downwards by the oscillator system in the strand welding systems presented here. In this way, the wires can be staggered symmetrically in both directions away from the welding plane. A shortening of the respective upper wire, which occurs with conventional production, can be avoided due to the resulting minor axial offset. Difficulties can additionally be avoided during assembly. An exact positioning of the single conductor of the two-conductor sheathed cable in the welding space is especially possible with the approach presented here.

In the line arrangement for connecting four wires produced according to the approach presented here, the lower left and right wires are bent/stressed no less than the upper wires. This results in an even distribution of the wires in the welding area, and consequently a stable welding process.

In addition, an even insertion depth of the wires into the welding space does not produce any fluctuations in the filling of the welding space. Irregular welding points caused, for example, by wire protrusions or burr formation can be avoided in this way. Due to the constant filling of the welding space, process monitoring is easy and there is a low process risk.

Because the four wires are not twisted to weld the second node after the first node is welded, it becomes unnecessary for an operator to twist four two meter-long wires including attachments such as contacts, seals, shafts, retainers, etc., and to reposition these again in the welding area, whereby a short production time can be achieved.

In the line arrangement presented here, all four wires are bent or loaded to the same extent, since a predicted center axis of the welding is arranged between the upper two wires and the lower two wires. This results in an even distribution of the wires in the welding area and consequently a stable welding process.

A special U-sound welding machine (wedge-reed system) can be used without mechanical limitation on both sides of the welding plane for the approach presented herein. Furthermore, special insertion masks/cable fixtures are used for exactly positioning and fixing the individual wires within the welding area. The operator clips the wires into wire fixtures. The positions of the wires are precisely defined as a result of a special geometry of the wire fixtures.

The two lower wire fixtures are firmly connected to the movable base plate. The top two wire fixtures are closed and locked at 90° to the operator. The wire fixtures are used to allow the individual conductors of the sheathed cable to protrude into the welding space in the correct position and length.

A space for intermediate storage of the wires is made available ahead and behind the welding space. The wires of the second node that are still to be welded are stored ahead of the welding space while the first node is being welded. The welded first node is stored behind the welding space while the second node is being welded.

If the rear node is welded first, the recess in the rear side shifter behind the welding area is used to store the completed first node, while the recess in the front side shifter in front of the welding area is used to store the four individual conductors for the second node. Conversely, the front node can be welded first, in which case the recess in the rear side shifter is used to temporarily store the four individual conductors for the second node, while the recess in the front side shifter is used to store the finished first node.

During the process, the machine automatically carries out the first welding, then lifts the complete base plate with the wire fixtures and positions the complete base plate in the next welding position. The base plate can move back into the base position or into a housing provided for this purpose after the second node has been completely welded. This saves another manual work step. The base plate can be moved pneumatically or electrically or by something similar.

Sensors on the wire fixtures detect whether the wire has been inserted correctly. Sensors located to the left and right of the machine detect whether the wire has been correctly twisted and positioned. In addition, the add-on parts are queried, e.g. whether the sealing cap, etc., is located thereon.

Display devices on the wire fixtures are used by the operator to visually confirm whether the wire is in the correct position. For example, a green LED can be used for the display.

For example, a general sequence in the production can begin in that the four wires are inserted into the wire fixtures and the welding process is started. The machine then welds the first node. As an option, the first node is checked. Then the device is lifted and placed in the rear position and set down. The machine then welds the second node. An inspection of the second node can optionally follow. After the welding process, the device moves to a base position for removing the wire. The device alternatively moves the welded lines into the housing provided for this purpose. The wires are finally removed. If an error is found during one of the inspections, the machine stops the production process. Specialized technical personnel can unlock the machine and remove the faulty part.

The approach presented here can be used for all H or Y high-voltage distributors. It enables a drastic reduction in handling effort with an associated increase in productivity and a significant reduction of the process risk. The approach presented herein can additionally increase the product quality.

A shorter cycle time or a reduction in the production time can be achieved since the two weld nodes are produced in a semi-automated manner. A reduction in defective parts can be achieved because fewer rejects are produced.

The operator is relieved because he/she no longer has to twist the four two meter-long lines. A reliable process can be documented, as each step is monitored and recorded.

In sum, a higher quality of the welding process can be achieved by reducing the scatter of the process. The product can be assembled on the welding device in that additional components, such as a housing, can be installed.

A partially automated production is described below, for example, on a Sonobond device.

A wire is first fixed in the welding area. A slight clamping of the wires due to an undersizing, a spring mechanism, a clamping mechanism, or something similar is carried out In this case, the wire ends or wire components can be queried.

Mold cavities/devices equipped with sensors are located to the left and right of the device. The contacted wire ends are inserted into these. Indicator lights mounted on the devices visually show the operator in which mold cavity and in which order the wires must be inserted. The wire ends and the additional wire components, such as sleeves and/or seals, etc., are queried using sensors and the software. This configuration can be adjusted separately for the X connector and Y connector.

This results in an easier insertion of the wires with a 100% monitorability of operator's work steps. A shorter production time per piece can additionally be achieved through predetermined work steps.

During the production of an X-connector, a first indicator light of the device lights up/flashes in a first step in the left area of the device and symbolizes the approval for inserting a first wire. The operator positions a contacted wire end of the first wire in a first wire fixture of the device. The side of the first wire to be welded is positioned and clamped in the first wire fixture. When all the components of the first wire are correctly positioned, the next step is automatically started.

In a second step, a second indicator light of the device lights up/flashes in the right area of the device and symbolizes the approval to insert a second wire. The operator positions a contacted wire end of the second wire in a second wire fixture of the device. The side of the second wire to be welded is positioned and clamped in the second wire fixture. When all the components of the second wire are correctly positioned, the next step is automatically started.

In a third step, a third indicator light of the device lights up/flashes in the left area of the device and symbolizes the approval for inserting a third wire. The operator positions a contacted wire end of the third wire in a third wire fixture of the device. The side of the third wire to be welded is positioned and clamped in the third wire fixture. When all the components of the third wire are correctly positioned, the next step is automatically started.

In a fourth step, another indicator light lights up/flashes on the third wire fixture and symbolizes the approval to lock the third wire fixture. The operator locks the third wire fixture at 90° onto the lower first wire fixture. The now upper third wire fixture is fixed by means of a locking mechanism, for example, latches, a clamping screw or the like to the lower first wire fixture.

In a fifth step, a fourth indicator light of the device lights up/flashes in the right area of the device and symbolizes the approval to insert a fourth wire. The operator positions a contacted wire end of the fourth wire in a fourth wire fixture of the device. The side of the fourth wire to be welded is positioned and clamped in the fourth wire fixture. When all the components of the fourth wire are correctly positioned, the next step is automatically started.

In a sixth step, another indicator light lights up/flashes on the fourth wire fixture and symbolizes the approval for locking the fourth wire fixture. The operator locks the fourth wire fixture at 90° onto the lower second wire fixture. The now upper fourth wire fixture is fixed by a locking mechanism, for example, latches, a clamping screw or the like to the lower second wire fixture.

In a seventh step, the ends of the strand ends are fixed in such a way that they are positioned slightly offset one above the other. The first bundle of strands is positioned immediately/first in the welding area. The second bundle is positioned in the front side slider in the precisely dimensioned recess. The recess is dimensioned in such a way that the second bundle of strands is not affected during the first welding process. After inserting the four wires, the operator starts the process with the start button.

After the first welding process, the complete device is automatically brought into the second welding position in an eighth step. This step is implemented pneumatically, electrically or by similar linear movements. The wires can be precisely positioned, for example, by means of a positioning cylinder in Z direction and a positioning cylinder in X direction. This is followed by a raising by 15 mm, a shift of 12 mm toward the rear, and a lowering by 15 mm with respect to one another.

When the device is arranged in the second welding position, the second welding node is automatically welded in a ninth step.

Since the devices and methods described above in detail are exemplary variations, they can be modified to a large extent in the usual way by a person skilled in the art without departing from the scope of the present disclosure. In particular the mechanical arrangements and the size ratios of the individual elements with respect to one another were only selected as examples.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for welding at least three cables, each with two conductors protruding from sheath ends of the cables, the method comprising:

stripping conductor ends of the first conductors and stacking alternately from opposite directions on top of one another to configure a first stack in which the conductor ends of a first cable are arranged in a working space from a first side, and a first conductor end of the first cable configures a first layer of the first stack in the working space;

stripping conductor ends of the second conductors and stacking alternately from opposite directions on top of one another at a working distance from the first stack to configure a second stack, a second conductor end of the first cable is arranged spaced by the working distance from the first conductor end of the first cable in the working space and forms a first layer of the second stack, the conductor ends of a second cable are arranged in the working space from a second side opposite the first side, the first conductor end of the second cable is aligned with the first stack and configures a second layer of the first stack, and the second conductor end of the second cable is aligned with the second stack and configures a second layer of the second stack, the conductor ends of a third cable are arranged in the working space from the first side, the first conductor end of the third cable is aligned with the first stack and configures a third layer of the first stack, and the second conductor end of the third cable is aligned with the second stack and configures a third layer of the second stack;

arranging the first stack in a welding area of a welding device and welding to configure a first welding point;

arranging the second stack in a waiting area spaced by the working distance from the welding area;

removing the first welding point from the welding area and moving by the working distance into a storage area; and removing the second stack from the waiting area and moving by the working distance into the welding area and welding to a second welding point.

2. The method according to claim 1, in which the conductor ends of a fourth cable are arranged in the working space from the second side, wherein the first conductor end of the fourth cable is aligned with the first stack and configures a fourth layer of the first stack, and the second conductor end of the fourth cable is aligned with the second stack and configures a fourth layer of the second stack.

3. The method according to claim 1, wherein the conductor ends of the second cable are aligned with a lateral offset with respect to the first stack and the second stack.

4. The method according to claim 1, wherein the cables which are welded together at the first and second welding points are moved to a packaging area, the first and second welding points are arranged in a junction box and are electrically insulated from one another, wherein the junction box is closed so that it seals against the cables extending from the junction box.

5. The method according to claim 1, in which the cables are inserted into fixing devices which are designed for axially and laterally positioning the conductor ends.

6. A device wherein the device is configured for performing or monitoring the method according to claim 1.

7. A method for welding at least three cables, each with two conductors protruding from sheath ends of the cables, the method comprising:

stripping conductor ends of the first conductors and stacking alternately from opposite directions on top of one another to configure a first stack;

stripping conductor ends of the second conductors and stacking alternately from opposite directions on top of one another at a working distance from the first stack to configure a second stack, the cables inserted into fixing devices which are designed for axially and laterally positioning the conductor ends wherein a first cable of the at least three cables is inserted into a first fixing device, a second cable of the at least three cables is inserted into a second fixing device, and a third cable of the at least three cables is inserted into a third fixing device which is then folded onto the first fixing device containing the first cable;

arranging the first stack in a welding area of a welding device and welding to configure a first welding point;

arranging the second stack in a waiting area spaced by the working distance from the welding area;

removing the first welding point from the welding area and moving by the working distance into a storage area; and removing the second stack from the waiting area and moving by the working distance into the welding area and welding to a second welding point.

8. The method according to claim 5, in which the sheath ends and/or the conductor ends are clamped in the fixing devices.

9. The method according to claim 7, in which the sheath end of the third cable is arranged at the sheath end of the first cable.

\* \* \* \* \*